(12) United States Patent
Hung

(10) Patent No.: US 8,042,429 B2
(45) Date of Patent: Oct. 25, 2011

(54) CONTROL SWITCH

(75) Inventor: Mu-Chen Hung, Kaohsiung Hsien (TW)

(73) Assignee: Taiwan Golden Bee Co., Ltd., Kaohsiung Hsien (TW)

( * ) Notice: Subject to any disclaimer, the term of this patent is extended or adjusted under 35 U.S.C. 154(b) by 693 days.

(21) Appl. No.: 12/135,224

(22) Filed: Jun. 9, 2008

(65) Prior Publication Data
US 2009/0305843 A1 Dec. 10, 2009

(51) Int. Cl.
G05G 1/10 (2006.01)

(52) U.S. Cl. ............. 74/506; 74/10.7; 74/473.3; 74/436

(58) Field of Classification Search ............... 74/10.7, 74/820, 436, 10.1, 10.15, 10.41, 473.19, 74/473.3, 500.5, 501.6, 502, 502.2, 502.3, 74/504, 505, 506, 507, 435; 200/43.11, 336
See application file for complete search history.

(56) References Cited

U.S. PATENT DOCUMENTS

| | | | | |
|---|---|---|---|---|
| 2,760,139 A * | 8/1956 | Luebking | ....................... | 318/674 |
| 2,934,970 A * | 5/1960 | Parstorfer | ....................... | 74/436 |
| 3,248,953 A * | 5/1966 | Holper et al. | ................ | 74/10.15 |
| 3,552,234 A * | 1/1971 | Gallina | ............................ | 74/820 |
| 3,987,680 A * | 10/1976 | Naoi et al. | .................... | 74/10.54 |
| 4,126,051 A * | 11/1978 | Hayakawa et al. | .......... | 74/10.41 |
| 4,327,597 A * | 5/1982 | Soto | .............................. | 74/415 |

* cited by examiner

Primary Examiner — Richard W Ridley
Assistant Examiner — Terence Boes
(74) Attorney, Agent, or Firm — Leong C. Lei

(57) ABSTRACT

A control switch includes a rotary shaft rotatably mounted therein. A switching knob is mounted to the rotary shaft and a surface of the control switch. Also, a stationary shaft is arranged beside the rotary shaft. A driving control disk and a locking control disk are sequentially and rotatably fit onto the stationary shaft so that when the switching knob on the surface is actuated, the rotary shaft is rotated to selectively drive cables through the driving control disk or the locking control disk to thereby effect switching of transmission modes and the function of locking. Thus, the amount of space required for installation is reduced and the chance of malfunctioning is also reduced and further, the costs are reduced.

4 Claims, 6 Drawing Sheets

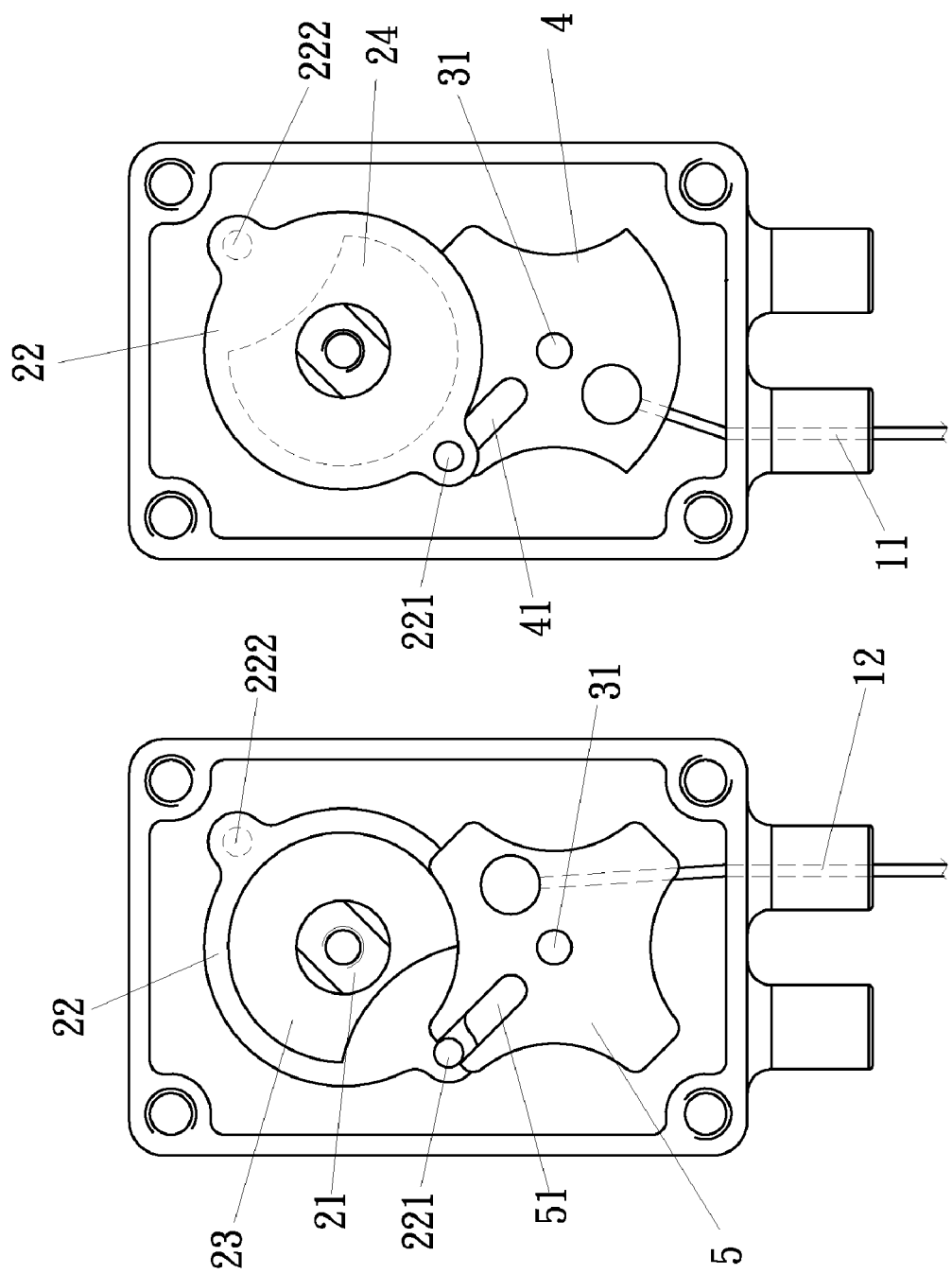

CONTROL SWITCH

BACKGROUND OF THE INVENTION (a) Technical Field of the Invention

The present invention relates to a control switch, and in particular to a control switch that uses a mechanical structure to effect transmission position switching so as to not only reduce the amount of space required for installation of the control switch, but also reduce malfunctioning rate of the control of switching transmission modes and reduce the costs.

(b) Description of the Prior Art

With the increase of national income due to development of economics, modern people are now capable of participating in various entertainments and leisure activities. Different persons like different activities and among all the currently available leisure activities, riding an all-terrain vehicle to travel on a beach is getting popular for many people. Due to the fact that the loose and soft sandy surface of the beach is apparently different from the rigid concrete or paved road surfaces that are design for the traveling of automobiles and motorcycles, the all-terrain vehicle is provided with a function of switching between transmission modes of two-wheel (2W) driving and four-wheel (4W) driving to allow a rider to switch between different transmission modes in accordance with the road or track condition, thereby preventing the vehicle from being trapped in the loose and soft sandy surface, which may lead to wheel slip and trapping of the wheel in a sand pit. The conventional all-terrain vehicles use electromagnetic control to switch between the 2W driving mode and the 4W driving mode. The known electromagnetic control is effective in carrying out mode switching, yet a step motor is required, which not only needs a large amount of space but is also expensive. Further, the electromagnetic control structure may fail to properly work when electric circuit breaks so that the electromagnetic control has a larger chance of malfunctioning. Thus, it is a challenge to both reduce the chance of malfunctioning and maintain smooth switching between different transmission modes.

SUMMARY OF THE INVENTION

The primary purpose of the present invention is to provide a control switch that uses a mechanical structure to effect switching of transmission control, wherein a single shaft is driven to control two cables for carrying out the operations of locking and switching of transmission modes so as to reduce the manufacturing costs and also reduce the chance of malfunctioning while reducing the amount of space needed for installation.

The control switch comprises a rotary shaft rotatably mounted therein. A switching knob is mounted to the rotary shaft and a surface of the control switch. Also, a stationary shaft is arranged beside the rotary shaft. A driving control disk and a locking control disk are sequentially and rotatably fit onto the stationary shaft so that when the switching knob on the surface is actuated, the rotary shaft is rotated to selectively drive the cables through the driving control disk or the locking control disk to thereby effect switching of transmission modes and the function of locking. Thus, the amount of space required for installation is reduced and the chance of malfunctioning is also reduced and further, the costs are reduced.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIGS. 4A and 4B schematically illustrate a 2W driving mode of the present invention;

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
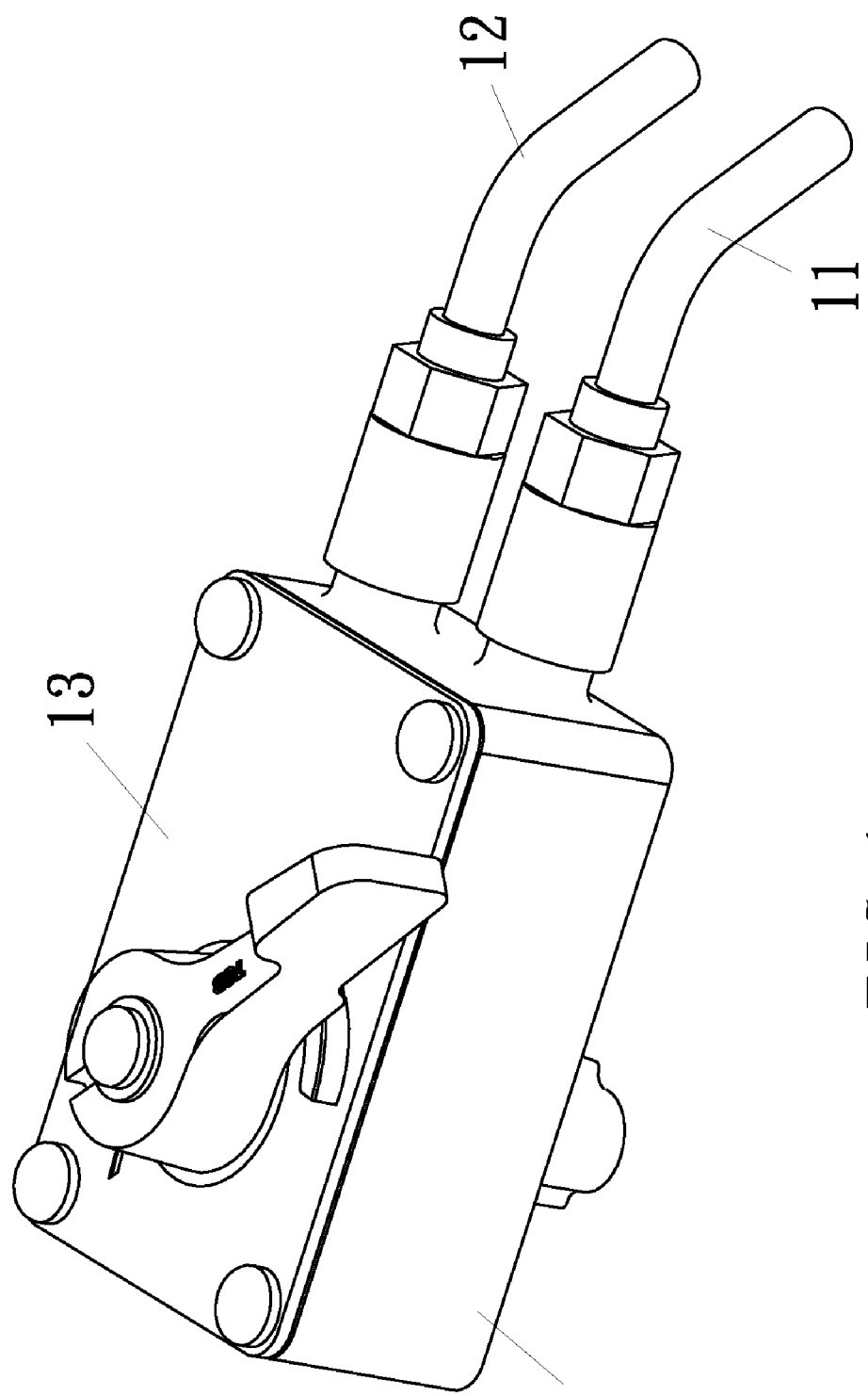
FIG. 1 is a perspective view of a preferred embodiment of the present invention.
Figure 2:
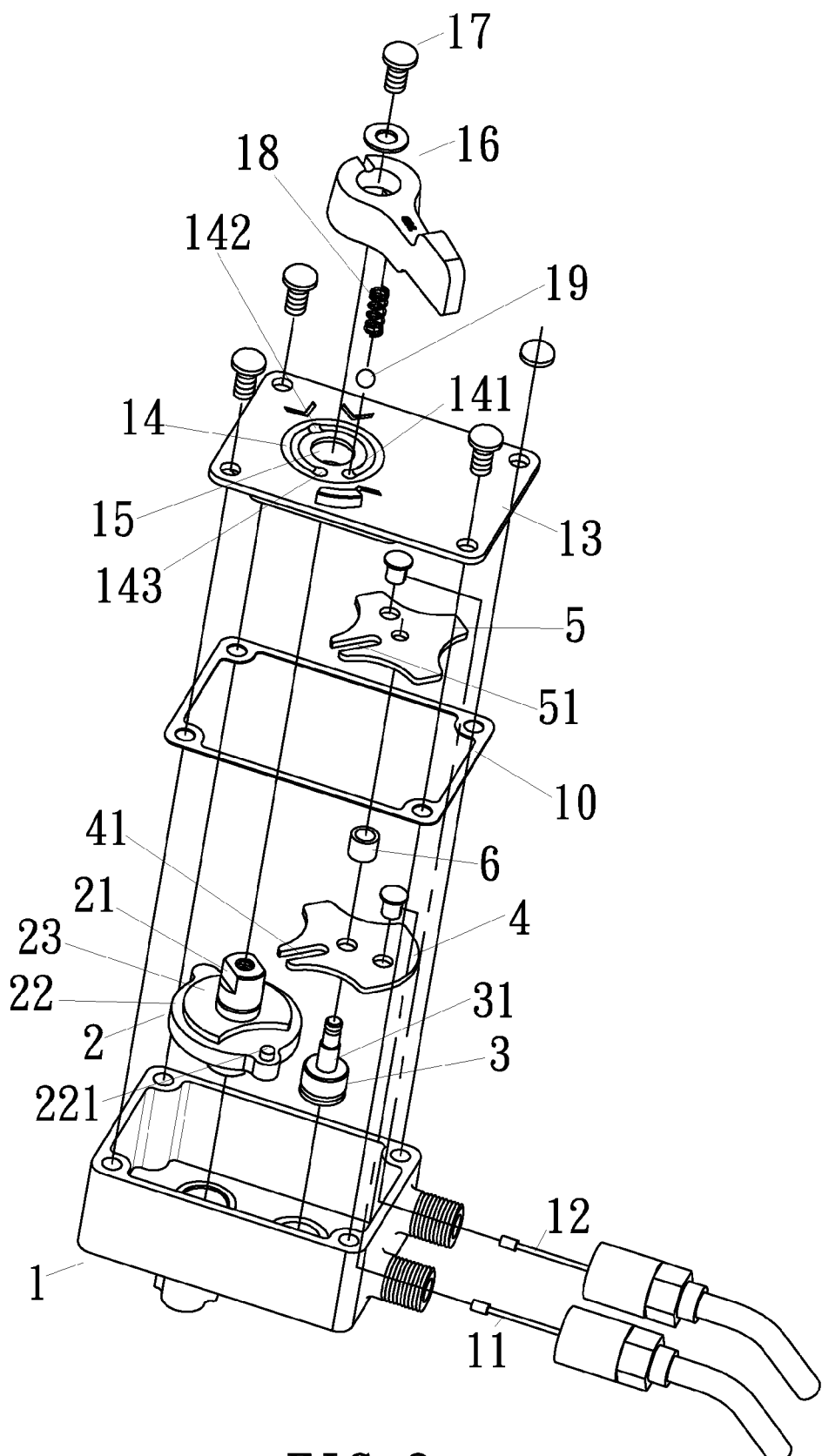
FIG. 2 is an exploded view of FIG. 1.
Figure 3:
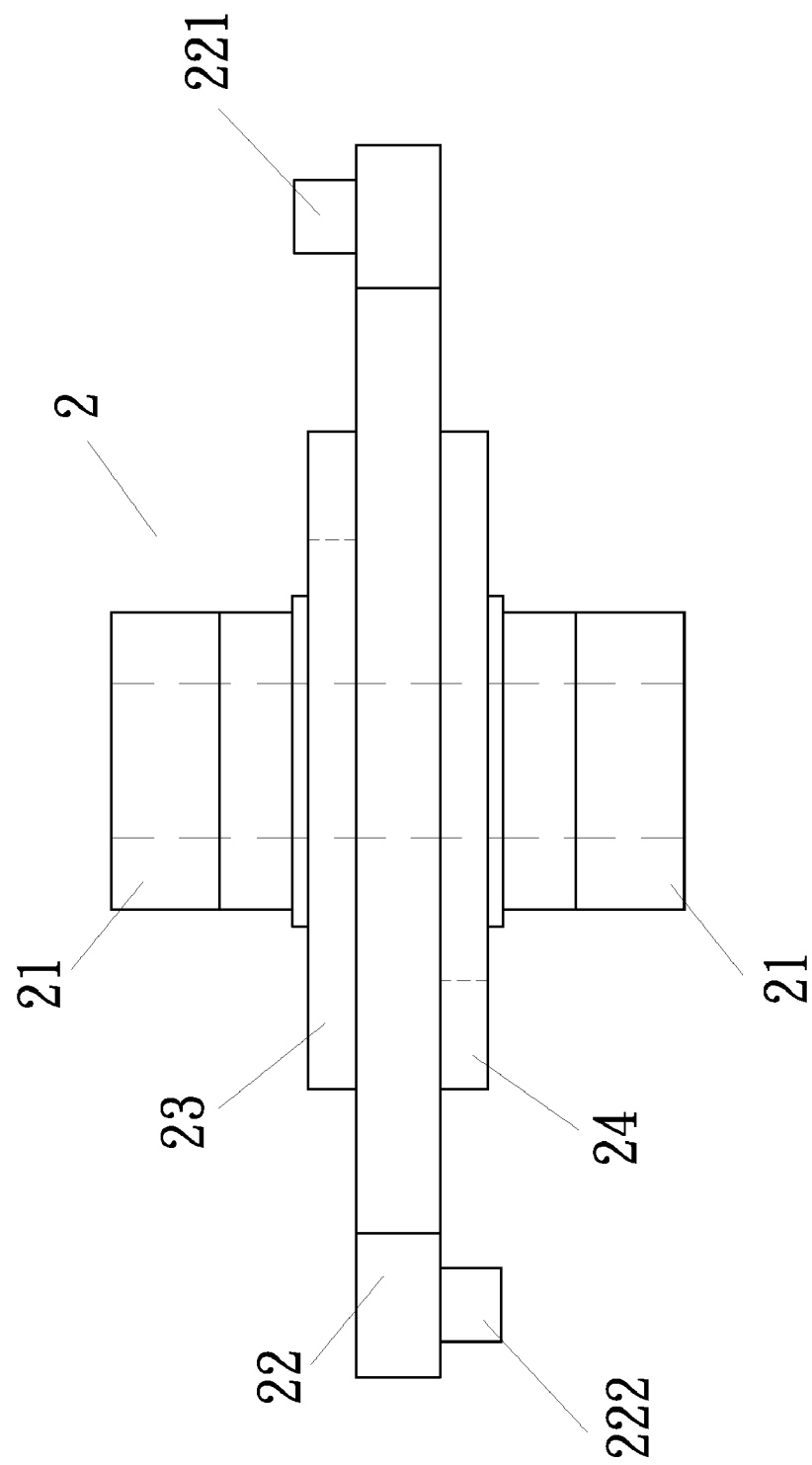
FIG. 3 is a front elevational view of a rotary shaft constructed in accordance with the present invention.

With reference to the drawings and in particular to FIGS. 1 and 2 first, a control switch constructed in accordance with the present invention comprises a control box 1 having an end to which two control cables 11, 12 are movably connected. The control box 1 has a surface that is closed by a lid 13, with a mated gasket 10, to form tight sealing. The lid 13 has a surface in which a recessed arc race 14 is formed. The race 14 is locally and further recessed in two ends and an intermediate point thereof to form first, second, and third locating points or pits 141, 142, 143. Inside an interior space of the control box 1, a rotary shaft 2 is rotatably mounted. Also referring to FIG. 3, the rotary shat 2 comprises a shaft bar 21 with a primary disk 22 centrally mounted thereto. Upper and lower surfaces of the primary disk 22 are respectively provided with arcuately-notched disks 23, 24 that have diameters smaller than that of the primary disk 22. Two circular projections are formed on opposite sides of the primary disk 22. One of the circular projections forms a peg 221 on an upper face thereof, while the other circular projection forms a peg 222 on a lower face thereof. An upper end of the shaft bar 21 is side chamfered and the upper end extends through and projects beyond a central bore 15 located centrally of the race 14 on the surface of the lid 13. A switch knob 16 is mounted to the projecting end of the shaft bar 21 by a threaded fastener 17 and mates the chamfered side of the shaft bar 21 so that the switch knob 16 and the rotary shaft 2 are set in a securely coupled condition, which allows the switch knob 16 to drive the rotation of the rotary shaft 2 in unison therewith. Further, a spring 18 is mounted to the switch knob 16 at a location corresponding to the race 14 and a steel ball 19 is arranged at an opposite end of the spring 18 with the steel ball 19 abutting against the race 14. Thus, when the switching knob 16 is actuated to rotate in for example a counterclockwise direction, the steel ball 19 moves along the race 14 in the counterclockwise direction. With the arrangement of the first, second, and third locating pits 141, 142, 143, when the steel ball 19 reaches any one of the pits, the steel ball 19 is trapped therein and forms a positioned and secured condition. A stationary shaft 3 is arranged beside the rotary shaft 2 and comprises a shaft bar 31 on which a locking control disk 4 forming a slide slot 41 and a driving control disk 5 forming a slide slot 51 are sequentially fit with the locking control disk 4 engaging an outer circumferential edge of a lower surface of the primary disk 22 and corresponding to the lower arcuately-notched disk 24, and the driving control disk 5 engaging an outer circumferential edge of the upper surface of the primary disk 22 and corresponding to the upper arcuately-notched disk 23. A spacing-setting ring 6 is set between the locking control disk 4 and the driving control disk 5 so that the locking control disk 4 and the driving control disk 5 are set in a mutually spaced manner, allowing the locking control disk 4 and the driving control disk 5 to be independently rotatable. The cable 11 is connected to the locking control disk 4, while the cable 12 is connected to the driving control disk 5. The arcuately-notched disks 23, 24 have outer arcuate sections respectively providing a function of retaining the locking control disk 4 and the driving control disk 5, so that the locking control disk 4 and the driving control disk 5, no matter what positions they are at, maintain operability without being affected by vibration caused by movement of vehicle or other factors.

Also referring to FIG. 4A, which schematically illustrates a two-wheel (2W) driving mode of an all-terrain vehicle, the peg 221 of the primary disk 22 is located within the slide slot 51 of the driving control disk 5 and the steel ball 19 on the underside of the switch knob 16 is set in abutting engagement with the first locating pit 141 of the race 14 for positioning. Also, as shown in FIG. 4B, the locking control disk 4 is not forced to operate by the rotation of the rotary shaft 2 and stays in a standstill condition.

Figures 5A, 5B:
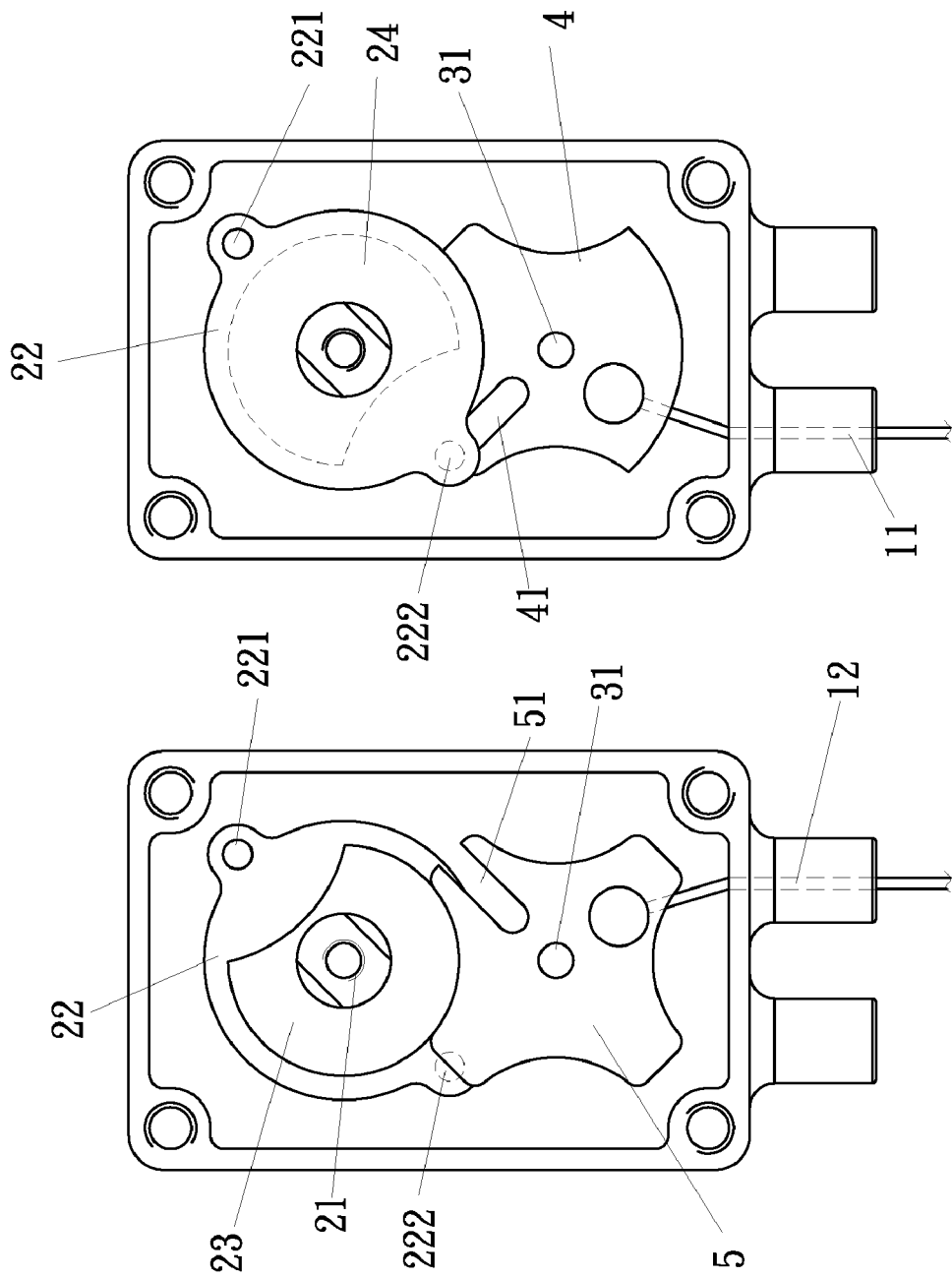
FIGS. 5A and 5B schematically illustrate a 4W driving mode of the present invention.

Then, referring to FIG. 5A, when the all-terrain vehicle is to be switched from the two-wheel (2W) driving mode to a four-wheel (4W) driving mode, the switching knob 16 is rotated 180 degrees, causing the peg 221 of the primary disk 22 to drive the slide slot 51 and thereby rotating the driving control disk 5 about the shaft bar 31 of the stationery shaft 3, which in turn forces the cable 12 to contract to effect switching from the two-wheel (2W) driving mode to the four-wheel (4W) driving mode. At this time, the steel ball 19 moves from the first locating pit 141 of the race 14 to the second locating pit 142 and trapped and positioned therein. As shown in FIG. 5B, the locking control disk 4 is not forced to operate by the rotation of the rotary shaft 2 and stays in the standstill condition. However, due to the rotation of the primary disk 22, the peg 222 is rotated to exhibit a status of being ready to get into and engage with the slide slot 41 of the locking control disk 4.

Figures 6A, 6B:
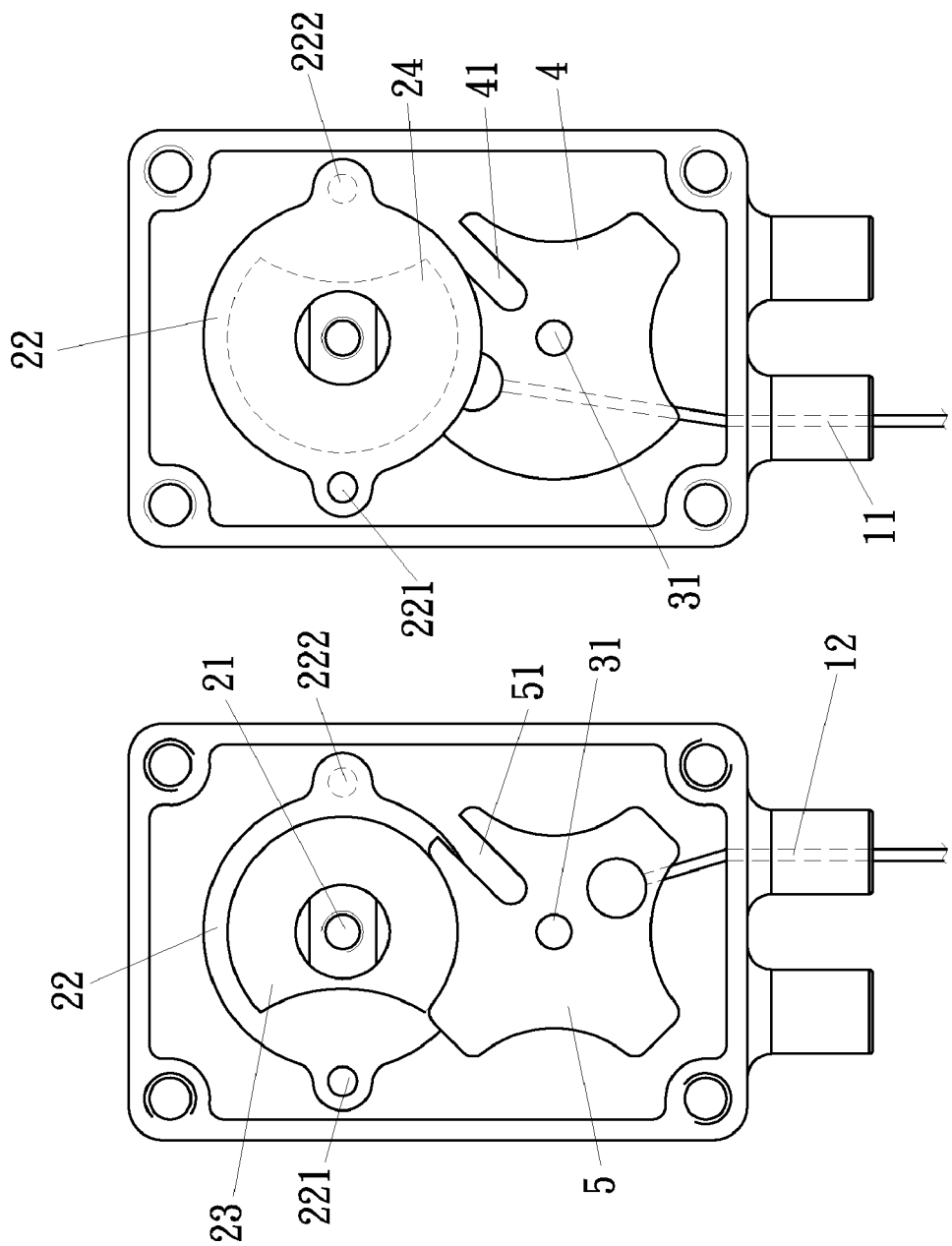
FIGS. 6A and 6B schematically illustrate a locking mode of the present invention.

Also referring to FIG. 6B, when the all-terrain vehicle is in the four-wheel (4W) driving mode and it is of a concern of poor road condition, or it is desired to release a vehicle from a wheel slip condition caused by wheel entrapped in muddy and sandy pit, the switching knob 16 is rotated against in the counterclockwise direction and with the rotation of the rotary shaft 2, the locking control disk 4 is simultaneously rotated to have the steel ball 19 moving to and trapped and positioned in the third locating pit 143 at the end of the race 14. With the rotation of the locking control disk 4, the cable 11 is driven to set a locking condition, wherein the transmission state becomes that two transmission shafts of two front wheels are set in a coaxial and synchronous transmission condition to thereby improve the anti-slip performance of an anti-slip differential. Thus, when the power is transmitted from an engine to wheels in slip condition, due to the two transmission shafts being locked together, the power from the engine can be transmitted to a non-slip wheel to thereby facilitate to get the vehicle out of the trapping. When it is being switched to the locking mode of four-wheel driving, as shown in FIG. 6A, the driving control disk 5 is not forced to operate and stays in a standstill condition.

In a rotary actuation of the switching knob 16, switching in a counterclockwise direction is carried out in the sequence of two-wheel (2W) driving, four-wheel (4W) driving, transmission shaft locking condition, and switching in a reversed direction is carried out sequentially back to the two-wheel (2W) driving.

The present invention uses a mechanical transmission having a single rotary shaft 2 causing rotation of the locking control disk 4 or the driving control disk 5 for driving or pulling at least two cables 11,12 for effecting switching from 2W to 4W or locking mode. With such a structure, there is no need to use a step motor that is incorporated in the conventional electromagnetic control. Thus, the amount of space used can be effectively reduced, which in turn increases the amount of space available for a designer and at the same time the manufacturing costs are reduced. Further, since provided by the present invention is a mechanical transmission, which as compared to the conventional electromagnetic control, can reduce the chance of malfunctioning and also reduce the maintenance costs.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A control switch comprising a hollow control box having an end to which two control cables are movably connected, the control box having a surface that is closed by a lid, with a mated gasket, to form a seal, the lid having a surface in which a recessed race is formed, a rotary shaft being rotatably arranged in an interior space of the control box, an upper end of a shaft bar of the rotary shaft projecting beyond the lid and coupled to a switching knob, a stationary shaft being arranged beside the rotary shaft and having a shaft bar to which a locking control disk forming a slide slot and a driving control disk forming a slide slot are sequentially fit, a spacing-setting ring being set between the locking control disk and the driving control disk to have the locking control disk and the driving control disk set in a mutually spaced manner, a first cable connected to the locking control disk, a second cable connected to the driving control disk, whereby when the switching knob is actuated, the rotary shaft is rotated to selectively cause rotation of the driving control disk or the locking control disk for forcing movement of the cables to realize switching of transmission mode or locking.

2. The control switch as claimed in claim 1, wherein the rotary shaft comprises a primary disk centrally mounted to the shaft bar of the rotary shaft, the primary disk having upper and lower surfaces which are respectively provided with diameter-reduced arcuately-notched disks, the arcuately-notched disks having outer arcuate sections respectively providing a function of retaining the locking control disk and the driving control disk, so that the locking control disk and the driving control disk, no matter what positions they are at, maintain operability without being affected by vibration caused by movement of a vehicle, and wherein two circular projections are formed on opposite sides of the primary disk, one of the circular projections forming a peg on an upper face thereof, while the other circular projection forming a peg on a lower face thereof.

3. The control switch as claimed in claim 1, wherein the recessed race formed in the lid is of an arc configuration and wherein the race is locally and further recessed in two ends and an intermediate location thereof to form first, second, and third locating pits, and wherein a spring is mounted to the switch knob at a location corresponding to the race, a steel ball being arranged at an end of the spring and in abutting engagement with the race.

4. The control switch as claimed in claim 1, wherein in a rotary actuation of the switching knob, switching in a counterclockwise direction is carried out in the sequence of two-wheel (2W) driving, four-wheel (4W) driving, transmission shaft locking condition, and wherein switching in a reversed direction is carried out sequentially back to the two-wheel (2W) driving.

* * * * *